United States Patent [19]

Beardmore

[11] 4,380,355
[45] Apr. 19, 1983

[54] GAS-LUBRICATED BEARINGS

[76] Inventor: Geoffrey Beardmore, 20 Oak Manor Dr., Cheltenham, Gloucestershire, England

[21] Appl. No.: 210,072

[22] Filed: Nov. 24, 1980

[30] Foreign Application Priority Data

Nov. 22, 1979 [GB] United Kingdom ............... 7940407

[51] Int. Cl.³ .......................................... F16C 32/06
[52] U.S. Cl. .................................................... 384/123
[58] Field of Search ................. 308/9, DIG. 1, 170, 308/160, 122, 73, 5 R

[56] References Cited

U.S. PATENT DOCUMENTS 3,870,382  3/1975  Reinhoudt ........................... 308/9
4,007,974  2/1977  Huber ................................ 308/170
4,315,660  2/1982  Glienicke ............................ 308/9

Primary Examiner—Lenard A. Footland
Attorney, Agent, or Firm—Pollock, Vande Sande & Priddy

[57] ABSTRACT

A hydrodynamic gas-lubricated bearing comprises a rotor with a smooth bearing surface, and a fixed bearing plate with a grooved surface. The grooves are of spiral configuration being separated by lands, the top surface of each of which has a convex profile. The central portion of the surface is raised above the edges so that wedge-shape regions are formed between the surface of the rotor on both sides of the central portion. The surface of the fixed bearing plate may be formed with an overall convex surface. The grooved surface of the fixed bearing plate is made by forming a pattern of grooves in a smooth blank and subsequently rounding off the top surface of the lands by rotating the bearing plate under pressure against a soft abrasive cloth.

7 Claims, 5 Drawing Figures

GAS-LUBRICATED BEARINGS

BACKGROUND OF THE INVENTION

This invention relates to gas-lubricated bearings and to methods of forming such bearings.

The invention is more especially concerned with hydrodynamic gas-lubricated bearings, that is, a bearing in which a lubricating gas film is generated by the relative movement between the bearing surfaces, rather than by an external source of pressurized gas.

Hydrodynamic gas-lubricated bearings comprise two surfaces one of which is smooth and the other of which is provided with a pattern of shallow grooves. In a rotary thrust bearing, the surfaces may, for example, be formed on flat disc-shape bearing members and, in this example, the grooves may be of a logarithmic spiral configuration. Relative rotational movement between the two surfaces causes gas to be entrained into the grooves and between the two surfaces, building up a film that separates the two bearing members, thereby permitting low-friction rotation. Bearings of this form are well-known and are described, for example, in U.K. Patent Specification Nos. 1 310 523, 1 310 524, 1 310 525 and 1 310 526. It is important, in the manufacture of such bearings that the surfaces have a polished and optically-flat finish and that the depth and profile of the grooves be within narrowly-defined limits. Ways of manufacturing such bearing surfaces are described in U.K. Patent Specification No. 1 258 741, 1 298 456 and 1 299 452.

The bearing surface need not be flat but can instead be on hemispherical or cylindrical surfaces.

When a gas-lubricated bearing is at rest the two bearing surfaces are normally in contact with one another and, because of the accurately formed surfaces, the area of contact can be relatively large. Problems can arise when starting such bearings before the gas film has fully separated the bearing surfaces, since the friction between the contacting regions can cause abrasion, wear and frictional heating. This can be an especially severe problem when the load on the bearing surfaces is high and in some cases can cause "wringing" between the two surfaces, that is, adhesion between the two surfaces caused by the intimate contact between the surfaces and the expelling of gas from between them.

In an attempt to overcome this problem with flat bearing surfaces it has been proposed to crown one or the other of the surfaces, as shown in FIG. 1 (to an exaggerated extent) by lapping it against a slightly concave lapping plate so as thereby to make the bearing surface slightly convex relative to the other surface. In this manner, the two bearing surfaces will contact only at the centre of the bearing surfaces thereby reducing the friction radius arm and the area of contact. It will be appreciated that the curvature on the crowned surface is only very slight and it has been found that it is difficult and expensive to form this surface accurately by lapping without a significant loss in the performance of the bearing.

BRIEF SUMMARY OF THE INVENTION

It is an object of the present invention to provide a gas-lubricated bearing and a method of forming such a bearing that may be used substantially to alleviate the above problem.

According to one aspect of the present invention there is provided a gas-lubricated bearing including first and second bearing members having first and second respective opposed surfaces, the first surface being smooth and uninterrupted, and the second surface being provided with a region of grooves separated by lands arranged such that relative movement between the first and second members causes generation of a gas film between the members, wherein the lands each have a surface of convex profile, the region of said lands closest the surface of the first member being intermediate the edges of the lands thereby forming substantially wedge-shape regions between the first and second members on opposite sides of the region of the lands closest the surface of the first member.

According to another aspect of the present invention there is provided a method of forming one member of a gas-lubricated bearing including the steps of forming in a smooth uninterrupted surface of the member a pattern of grooves separated by lands arranged to enable the generation of a lubricating gas film by relative movement of another member with respect to the grooved member, wherein the method includes the further steps of contacting the surface of the grooved member with a deformable abrasive member and causing relative displacement between the grooved surface and the abrasive member, pressure being applied by the abrasive member to the grooved surface sufficient to cause the edges of each land to be subjected to greater abrasive action than the region of the lands intermediate the edges so that the lands are thereby each given a surface of convex profile, the region of each land intermediate the edges being raised above the edges.

By giving each land a convex surface of this kind the area of contact between the two bearing members when at rest is reduced. The wedge-shape regions between the two members also helps improve separation of the two members at low rotational speeds. The method of producing such a bearing is, moreover, relatively simple and inexpensive.

The surface of the first member may be flat and the surface of the second member may be convex. The height of the region of the lands closest the first member, above the edges of the lands, may be between substantially two and five percent of the depth of the grooves.

A gas-lubricated bearing for a gyroscope and a method of forming such a bearing, both according to the present invention, will now be described, by way of example, with reference to the accompanying drawing.

DETAILED DESCRIPTION

Figure 1:
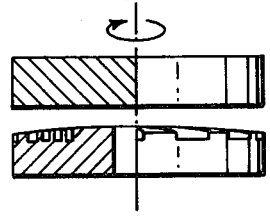
FIG. 1 is a part-sectional side-elevation showing diagrammatically a previous form of gas-lubricated bearing.
Figure 2:
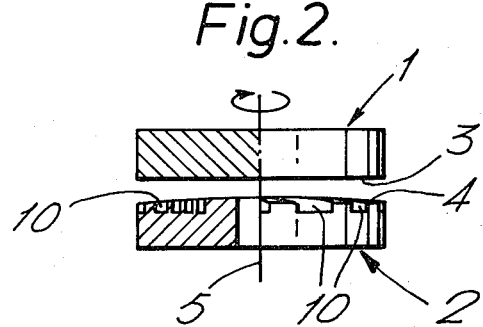
FIG. 2 is a part-sectional side-elevation showing diagrammatically a gas-lubricated bearing according to the present invention.
Figure 3:
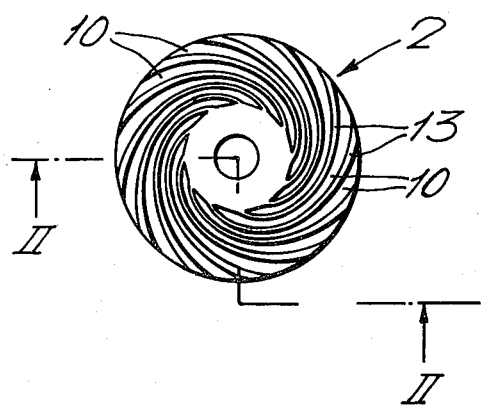
FIG. 3 shows the surface of a part of the bearing of FIG. 2.

With reference to FIGS. 2 and 3, the gas-lubricated bearing comprises two circular disc-shape plates 1 and 2 of boron carbide that are formed on their opposed respective faces with bearing surfaces 3 and 4. The upper plate 1 is mounted for rotation about its axis 5 which is central of the plates; the lower plate 2 is fixed.

The bearing surface on the face 3 of the upper plate 1, or rotor, is formed with a smooth uninterrupted optically-flat finish and may be made by any suitable well-known technique, such as, for example, by mechanical or chemical polishing.

Figure 4:
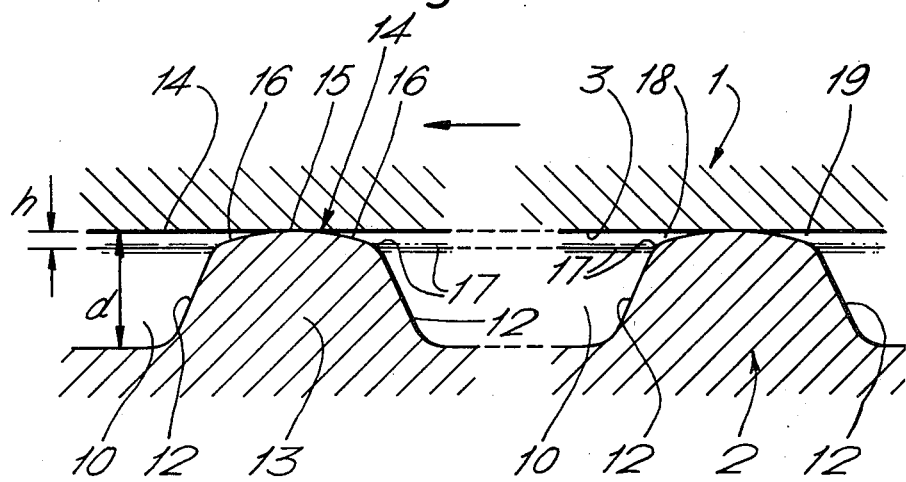
FIG. 4 is an enlarged view of a part of FIG. 2.

The bearing surface on the face 4 of the lower plate 2, or thrust plate, is slightly convex and is formed with several spiral grooves 10 (FIG. 3) of logarithmic configuration that extend from a region towards the centre of the plate 2 outwards to the edge of the plate. With reference now to FIG. 4, the grooves 10 have a depth d between 220 and 240 micro inches (5.59 and 6.10 micron), and are formed with slightly inclined walls 12. The region between the grooves 10, that is, the lands 13, are each formed with a convex upper surface 14, the height h of the highest part 15 (that is, the part closest the face 3 of the rotor plate 1) above the lowest part 16 (that is, the part adjacent the grooves 10) of the upper surface of the lands being between about 2% and 5% of the groove depth d. The height h is therefore between about 4.4 micro inches (0.11 micron) and 12.0 micro inches (0.31 micron). The edges 17 of the lands 13, between the upper surface 14 and the walls 12 are rounded.

When the bearing is at rest, the rotor 1 rests on the thrust plate 2, contacting it only at the top part 15 of the upper surface 14 of the lands 13. The area of contact between the two bearing parts 1 and 2 is thereby less than would be the case if the upper surface of the lands were parallel with the surface 3 of the rotor. Two regions 18 and 19, of approximately wedge-shape cross-section, are formed on opposite sides of the region of contact between the two bearing parts 1 and 2, thereby enabling an air film to be formed across almost the entire area of the bearing surfaces 3 and 4 when at rest. At low rotational speeds, gas is drawn into the wedge-shape regions 18 and 19 generating pressure that assists separation of the two bearing parts 1 and 2. At these very low rotational speeds (around one or two revolutions each second) the shallow wedge-shape regions 18 and 19 have a more efficient pumping action than the grooves 10, which are designed to give maximum performance at high speeds (around four hundred revolutions each second). The action of the wedge-shape regions 18 and 19 is also more efficient at the very small clearances which occur at these low speeds, the grooves 10 being designed to operate at larger clearances (such as, around ninety micron).

Although in the present embodiment the region of contact 15 on each land 13 is located centrally across the width of the land, it would be preferable to form the region of contact to one side of the land such that the top surface 14 is asymmetrical. More particularly, the region of contact 15 is preferably situated forwardly of the direction of rotation of the rotor 1, that is, such that the larger of the two wedge-shape regions 18 and 19 is at the higher pressure side of the region of contact. It is, however, more difficult to form asymmetrical surfaces of this kind.

Figure 5:
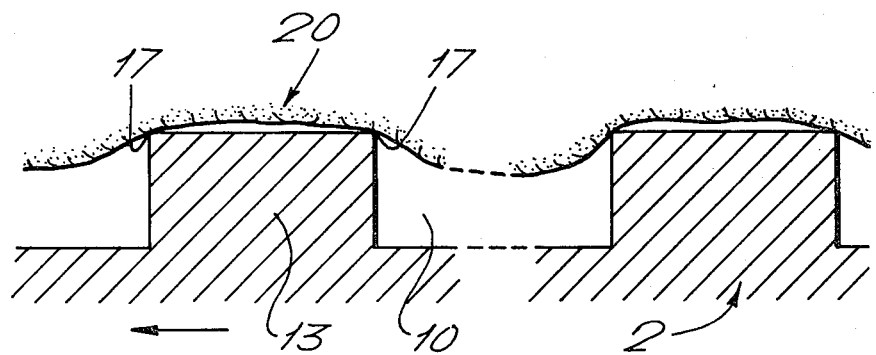
FIG. 5 shows a step in the manufacture of the bearing.

The thrust plate 2 is made by forming grooves in the surface of a flat substrate, then rounding the top surface of the lands between the grooves and at the same time producing a slightly convex surface on the substrate. The grooves 10 may be made by any of the well-known methods such as, for example, by subjecting an optically-flat substrate to ion bombardment through a mask such as to etch away the exposed regions to form the required pattern of grooves; this method is further described in U.K. Patent Specification No. 1 298 456. Other methods, such as chemical or mechanical erosion could alternatively be used. After the grooves have been formed, the plate 2 is lightly polished (FIG. 5) with a cloth 20 (such as a Metron cloth. "Metron" is a trademark of Metallurgical Services Laboratories Limited, Betchworth, Surrey) having a deformable soft, fine, velvet-like texture and that is impregnated with a fine (0.25 micron particle size) diamond dust in a carrier fluid applied in aerosol form. The plate 2 is rotated at slow speed (typically about 2.25 revolutions per second) against the cloth 20 under a loading weight of about 1.75 kg. The pressure applied during polishing, and the texture of the cloth is such that the cloth is pressed into the grooves 10, below the upper surface 14 of the lands 13, and around the edge of the plate 2, thereby exerting maximum pressure on the edges 17 of the lands and on the edge of the plate. In this way, the sharp edges of the lands 13 are removed. The plate 2 is then thermochemically polished to less than one light band flatness and to remove all previous machining marks from the upper surface 14 of the lands 13.

The plate 2 is then given another polish with the same cloth 20 impregnated with diamond dust, under the same loading weight. This final polishing is continued until a convex surface of the required profile is formed on top of the lands 13, which also results in a slight crowning of the entire surface 4 of the plate 2. The method of polishing is to be distinguished from a buffing operation where a rapidly rotating polishing surface is applied under light pressure. Damage to the surface can arise in such buffing and a convex land surface of the required profile would not in general be formed.

The invention is not restricted to gas-lubricated bearings having flat opposed surfaces but could also be used on cylindrical members. Grooves on such cylindrical members are generally of a helical, herringbone configuration extending about the axis of the member and it will be understood that, in accordance with the present invention, the surface of the lands separating the grooves will have a convex profile across their thickness, that is, normal to the groove length.

What I claim is:

1. A gas-lubricated bearing of the kind comprising first and second bearing members having first and second respective opposed surfaces, the first surface being smooth and uninterrupted, and the second surface being provided with a region of spiral grooves separated by lands arranged such that relative movement between the first and second members causes entrainment of gas along said grooves and generation of a gas film between the members, the improvement wherein said lands each have an upper surface of convex profile, the region of the lands closest the surface of said first member being located intermediate the edges of the upper surface of the lands thereby forming substantially wedge-shaped cross-sectional regions between said first and second members on opposite sides of the region of the lands closest the surface of said first member.

2. A gas-lubricated bearing according to claim 1, wherein the surface of said first member is flat, and the surface of said second member is convex.

3. A gas-lubricated bearing according to claim 1, wherein said edges are rounded.

4. A gas-lubricated bearing according to claim 1, wherein said lands are separated from said grooves by walls, and wherein said walls are inclined from the vertical.

5. A gas-lubricated bearing according to claim 1, wherein said grooves are between substantially 5.59 and 6.10 micron deep.

6. A gas-lubricated bearing according to claim 1, wherein the height of the region of said lands closest the first member, above the edges of the lands, is between substantially two and five percent of the depth of the grooves.

7. A gas-lubricated bearing comprising first and second bearing members having first and second respective opposed surfaces, the said first surface being smooth, flat and uninterrupted, and the second surface being provided with a region of spiral grooves separated by lands arranged such that the relative movement between the first and second members causes entrainment of gas along said grooves and generation of a gas film between the members, wherein said lands each have an upper surface of convex profile the edges of which are rounded, the region of the lands intermediate said edges being raised above the edges, thereby forming substantially wedge-shaped cross-sectional regions between the first and second members on opposite sides of the raised region of the lands.

* * * * *

UNITED STATES PATENT AND TRADEMARK OFFICE
CERTIFICATE OF CORRECTION

PATENT NO. : 4,380,355
DATED : April 19, 1983
INVENTOR(S) : Geoffrey Beardmore

It is certified that error appears in the above—identified patent and that said Letters Patent is hereby corrected as shown below:

On the title page add -- [73] Assignee: Smiths Industries Public Limited Company, London, England --.

Signed and Sealed this

Ninth Day of August 1983

[SEAL]

Attest:

GERALD J. MOSSINGHOFF

Attesting Officer

Commissioner of Patents and Trademarks